(12) United States Patent
Hashimoto et al.

(10) Patent No.: US 10,591,008 B2
(45) Date of Patent: Mar. 17, 2020

(54) DISC BRAKE AND PISTON

(71) Applicant: HITACHI AUTOMOTIVE SYSTEMS, LTD., Ibaraki (JP)

(72) Inventors: Kumi Hashimoto, Machida (JP); Yoichi Kumemura, Yokohama (JP); Keisuke Taniguchi, Atsugi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/755,320

(22) PCT Filed: Jun. 21, 2016

(86) PCT No.: PCT/JP2016/068315
§ 371 (c)(1),
(2) Date: Feb. 26, 2018

(87) PCT Pub. No.: WO2017/073110
PCT Pub. Date: May 4, 2017

(65) Prior Publication Data
US 2018/0245648 A1 Aug. 30, 2018

(30) Foreign Application Priority Data
Oct. 26, 2015 (JP) ................... 2015-210039

(51) Int. Cl.
*F16D 65/18* (2006.01)
*F16D 65/16* (2006.01)
(Continued)

(52) U.S. Cl.
CPC ........... *F16D 65/18* (2013.01); *F16D 55/226* (2013.01); *F16D 65/0006* (2013.01);
(Continued)

(58) Field of Classification Search
CPC ............ F16D 65/0006; F16D 65/0018; F16D 2125/06; F16D 65/16; F16D 65/18;
(Continued)

(56) References Cited
U.S. PATENT DOCUMENTS 2,937,722 A * 5/1960 Ruet ...................... F16D 65/095
188/152
3,486,593 A * 12/1969 Afanador ................ F16D 65/54
188/196 P
(Continued)

FOREIGN PATENT DOCUMENTS

| JP | 4-219534 | 8/1992 | |
|---|---|---|---|
| JP | 07071519 A * | 3/1995 | ......... F16D 65/0006 |
| JP | 10-122280 | 5/1998 | |

OTHER PUBLICATIONS

International Search Report dated Jul. 26, 2016 in International Application No. PCT/JP2016/068315.

*Primary Examiner* — Thomas J Williams
(74) *Attorney, Agent, or Firm* — Wenderoth, Lind & Ponack, L.L.P.

(57) ABSTRACT

Provided are a disc brake and a piston whose weights can be effectively reduced. A disc brake includes a piston configured to press a pad against a disc. The piston includes a body member formed into a bottomed cylindrical shape and including a cylinder portion and a bottom portion. The cylinder portion and the bottom portion are approximately equal in wall thickness. The piston further includes a plate-shaped member fixed to an external bottom surface of the body member and disposed within a range of the external bottom surface and in a region including a center of the external bottom surface.

7 Claims, 7 Drawing Sheets

(51) Int. Cl.
  *F16D 55/226* (2006.01)
  *F16D 65/00* (2006.01)
  *F16J 1/00* (2006.01)
  *B60T 1/06* (2006.01)
  *F16D 121/04* (2012.01)
  *F16D 125/06* (2012.01)

(52) U.S. Cl.
  CPC ............ *F16D 65/16* (2013.01); *F16D 65/183* (2013.01); *F16J 1/005* (2013.01); *F16J 1/006* (2013.01); *B60T 1/065* (2013.01); *F16D 2121/04* (2013.01); *F16D 2125/06* (2013.01); *F16D 2200/0021* (2013.01); *F16D 2200/0056* (2013.01); *F16D 2250/0023* (2013.01)

(58) Field of Classification Search
  CPC ....... F16D 65/183; F16D 55/226; F16J 1/005; F16J 1/006
  USPC ............ 188/73.1, 72.4, 73.36, 73.37; 92/212
  See application file for complete search history.

(56) References Cited

U.S. PATENT DOCUMENTS

| | | | | |
|---|---|---|---|---|
| 4,203,354 A | * | 5/1980 | Cunningham | ....... F16J 15/3268 188/72.4 |
| 5,127,494 A | | 7/1992 | Mery | |
| 5,664,848 A | * | 9/1997 | Muraski | .................... B60T 8/00 138/31 |
| 5,735,314 A | * | 4/1998 | Alaze | .................... B60T 8/4068 138/31 |
| 6,604,612 B2 | * | 8/2003 | Nagy | .................... B60T 8/4068 188/72.4 |

* cited by examiner

DISC BRAKE AND PISTON

TECHNICAL FIELD

The invention relates to disc brakes and pistons.

BACKGROUND ART

Some pistons include inner members formed into bottomed cylindrical shape and outer members fitted and fixed onto the outer side of the inner members (see Patent Literature 1, for example).

CITATION LIST

Patent Literature

PTL 1: Japanese Unexamined Patent Application Publication No. H10-122280

SUMMARY OF INVENTION

Technical Problem

When pistons are configured as described above, it is unlikely that piston weight can be efficiently reduced.

It is an object of the invention to provide a disc brake and a piston whose weights can be reduced.

Solution to Problem

To accomplish the object, according to one embodiment of the invention, a piston includes a body member formed into a bottomed cylindrical shape and including a cylindrical portion and a bottom portion which are approximately equal in wall thickness, and a plate-shaped member fixed to an external bottom surface of the body member, the plate-shaped member being disposed within an area of the external bottom surface and in a region including a center of the external bottom surface.

The one embodiment of the invention enables an effective weight reduction.

BRIEF DESCRIPTION OF DRAWINGS

FIG. 3(*a*) is a conceptual drawing of an adhesion layer before deformation, and (b) and (c) are conceptual drawings of the adhesion layer after deformation:

FIGS. 4(*a*), (*b*) and (*c*) are a sectional view of a piston as a standard for comparison before deformation, a sectional view of the piston after deformation, and a plan view of the piston, respectively:

FIGS. 5(*a*) and (*b*) are a sectional view of a modification of the piston according to the first embodiment and a sectional view of another modification of the piston respectively;

DESCRIPTION OF EMBODIMENTS

First Embodiment

Figure 1:
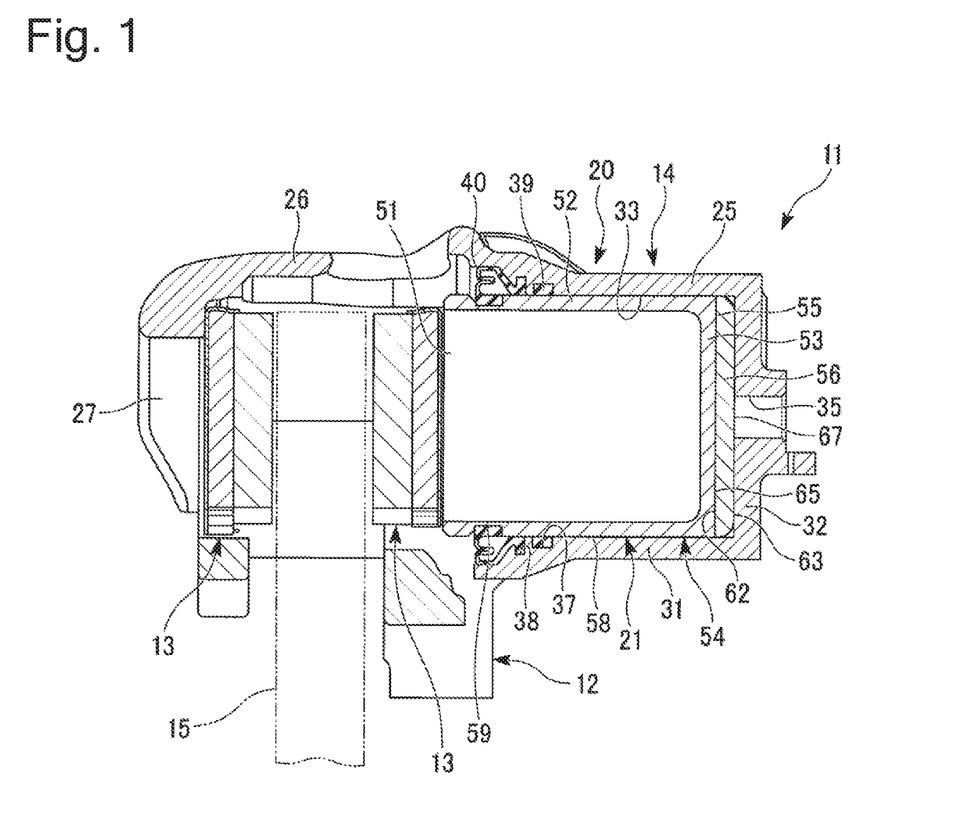
FIG. 1 is a sectional view showing a disc brake according to a first embodiment.

A first embodiment will be explained below with reference to FIGS. 1 to 5. FIG. 1 shows a disc brake 11 according to the first embodiment. The disc brake 11 is intended for vehicles, such as automobiles, or more specifically, for four-wheeled vehicles. The disc brake 11 includes a carrier 12, a pair of pads 13, and a caliper 14. The disc brake 11 brakes a vehicle by stopping the rotation of a disc 15 rotating with a wheel, not shown, which is subjected to braking.

The carrier 12 straddles an outer diameter side of the disc 15 and is fixed to a non-rotational section of the vehicle. The pair of pads 13 is supported by the carrier 12 so as to be movable in an axial direction of the disc 15 with the pads 13 placed in opposite sides of the disc 15. The caliper 14 is supported by the carrier 12 so as to be slidable in the axial direction of the disc 15 while straddling the outer diameter side of the disc 15.

The caliper 14 stops the rotation of the disc 15 by pressing the pair of pads 13 against the disc 15. The caliper 14 includes a caliper body 20 supported by the carrier 12 while straddling the disc 15, and a piston 21 held within the caliper body 20 and disposed to face one surface side of the disc 15. The caliper body 20 integrally includes a cylinder 25 applied with brake fluid pressure, a bridge 26 straddling the disc 15, and a claw portion 27 pressing the outer pad 13 of the pair of pads 13.

The cylinder 25 is disposed to face an axially inner surface of the disc 15 (face on the inner side in a vehicle-width direction), and has a shape of a bottomed cylindrical shape including a cylindrical cylinder side-portion 31 that opens to the disc 15 side, and a cylinder bottom portion 32 that closes an opposite side of the cylinder side-portion 31 to the disc 15. A containing hole 33 is formed inside the cylinder side-portion 31 and the cylinder bottom portion 32 of the cylinder 25. The containing hole 33 opens to the disc 15 side and extends along the axial direction of the disc 15. The piston 21 is slidably inserted in the containing hole 33. The bridge 26 is so formed as to extend from the cylinder 25 in the axial direction of the disc 15 in order to straddle the disc 15. The claw portion 27 protrudes from an opposite end of the bridge 26 to the cylinder 25, to be located on the opposite side from the cylinder 25. The claw portion 27 is opposed to an outer surface of the disc 15 (face on the outer side in the vehicle-width direction).

A tube-connecting hole 35 is formed in the cylinder bottom portion 32 coaxially with a central axial line of the containing hole 33. The pipe-connecting hole 35 is connected to a brake pipe, not shown. The caliper 14 causes the piston 21 to advance toward the disc 15 using the brake fluid pressure which is introduced through the pipe-connecting hole 35 into the containing hole 33. The piston 21 then moves along the axial direction of the disc 15 and presses the inner pad 13 against the disc 15 along the axial direction of the disc 15. This pressure reaction force of the piston 21 makes the caliper body 20 move along the axial direction of the disc 15 relative to the carrier 12 in such a direction as to separate the cylinder 25 away from the disc 15, so that the claw portion 27 presses the outer pad 13 against the disc 15 along the axial direction of the disc 15. In this manner, the piston 21 and the claw portion 27 sandwich the pads 13 on both sides to press the pads 13 against the disc 15, creating friction resistance and thus generating a braking force.

A seal groove 37 is formed in an inner peripheral surface of the cylinder side-portion 31, which forms the containing hole 33. The seal groove 37 is located in an axially middle point of an opening-side of the cylinder side-portion 31. The seal groove 37 has an annular shape that is indented radially outward. A boot groove 38 is formed in the inner peripheral surface of the cylinder side-portion 31 in a position closer to the opening of the cylinder side-portion 31 than the seal groove 37. The boot groove 38 has an annular shape that is indented in radially outward. Fitted in the seal groove 37 is an annular piston seal 39 for sealing a gap between the piston 21 and the cylinder side-portion 31. Fitted in the boot groove 38 is one end portion of an annular boot 40 that is interposed between the piston 21 and the cylinder side-portion 31.

Figure 2:
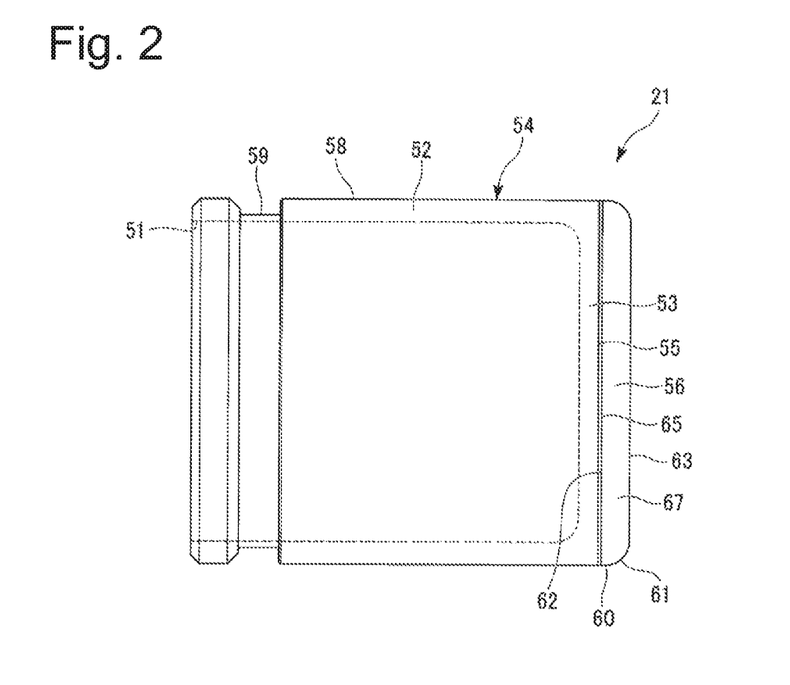
FIG. 2 is a side view of the piston according to the first embodiment.
Figure 3:
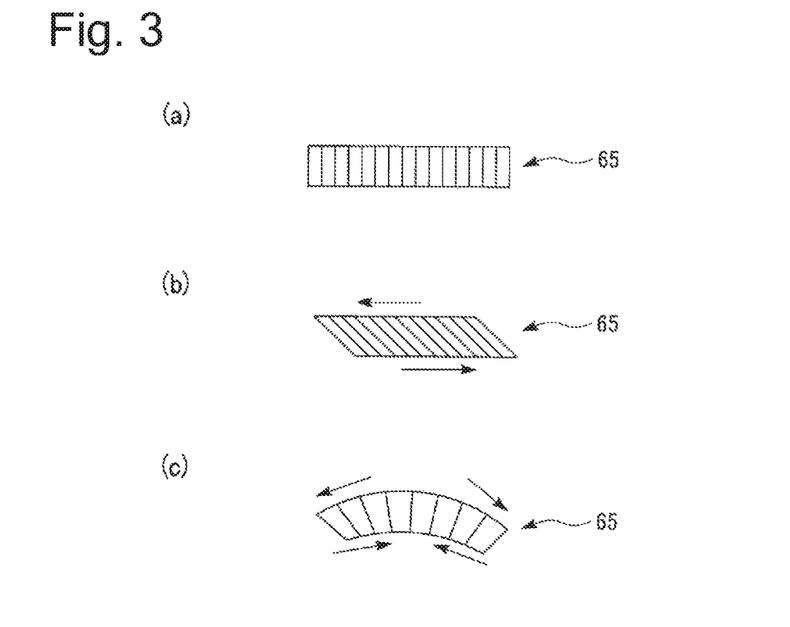

The piston 21 includes a bottomed cylindrical body member 54 including a body side-portion 52 (side-portion) in a cylindrical shape and a body bottom portion 53 (bottom portion). One side of the body side-portion 52 is opened to form an opening 51. The body bottom portion 53 is located on the opposite side to the opening 51 of the body side-portion 52. The piston 21 further includes a plate-shaped member 56 that is a separate member from the body member 54. The plate-shaped member 5 is disposed on a body external bottom surface 55 of the body bottom portion 53, which is located on an outer side opposite to the opening 51.

As shown in FIG. 2, a boot groove 59 is formed in the body side-portion 52 of the body member 54 on the opening 51 side in the axial direction. The boot groove 59 is indented radially inward with respect to a cylindrical face-shaped greatest outer diameter surface 58 of the body member 54. The body external bottom surface 55 of the body bottom portion 53 is a circular flat surface orthogonal to a central axis of the body side-portion 52. The body member 54 is formed chiefly by applying press work to a steel sheet having constant sheet thickness. The body bottom portion 53 and the body side-portion 52 are therefore approximately equal in wall thickness.

The plate-shaped member 56 has a shape of a circular disc. In an outer peripheral side of the plate-shaped member 56, a greatest outer diameter surface 60 having a cylindrical face shape is formed in one axial side, and a round chamfering 61 is formed from an axially middle point to the other axial side. The greatest outer diameter surface 60 has the same outer diameter as the greatest outer diameter surface 58. The plate-shaped member 56 has constant sheet thickness, except an outer diameter region where the round chamfering 61 is formed in a radial direction. The plate-shaped member 56 is flat and circular in a one side surface 62 in a thickness direction. The surface 62 has area that is equal to area of the body external bottom surface 55 of the body member 54. The plate-shaped member 56 is flat and circular in the other side surface 63 in the thickness direction. The surface 63 has smaller area than the surface 62 by as much as the round chamfering 61 is formed. The surfaces 62 and 63 are arranged parallel to each other. The plate-shaped member 56 is also formed chiefly by applying press work to a steel sheet having constant sheet thickness. The plate-shaped member 56 is made of the same material as the body member 54. However, the plate-shaped member 56 and the body member 54 may be made of different materials from each other.

A whole surface of the surface 62 of the plate-shaped member 56 is bonded with an adhesive to a whole surface of the body external bottom surface 55 of the body member 54. The plate-shaped member 56 is coaxially fixed to the body member 54. This is how the piston 21 is formed, which includes the body member 54, the plate-shaped member 56, and an adhesion layer 65 (damping member) placed between the body member 54 and the plate-shaped member 56. The plate-shaped member 56 thus mounted on the body member 54 is disposed within a radial range of the body external bottom surface 55 of the body bottom portion 53 of the body member 54 and in a region including a radial center of the body bottom portion 53. The plate-shaped member 56 covers the whole surface of the body external bottom surface 55. The plate-shaped member 56 is a reinforcing member for reinforcing the body bottom portion 53 of the body member 54.

The opening 51 of the body member 54 is the opening 51 formed in the one axial side of the piston 21. The body side-portion 52 of the body member 54 is a cylindrical piston side-portion 52 of the piston 21. The body bottom portion 53 of the body member 54, the adhesion layer 65, and the plate-shaped member 56 form a piston bottom portion 67 of the piston 21, which closes the other axial side of the piston side-portion 52. The surface 63 of the plate-shaped member 56 is a piston external bottom surface 63 on the side opposite to the opening 51 of the piston 21. The boot groove 59 is formed in the piston side-portion 52.

In the present embodiment, a phenol-based adhesive is used as the adhesive for bonding the plate-shaped member 56 to the body bottom portion 53 of the body member 54. The adhesion layer 65 is therefore a phenol-based resin layer.

As shown in FIG. 1, the piston 21 is inserted into the containing hole 33 in the cylinder side-portion 31 with the piston bottom portion 67 foremost. The piston 21 is accordingly positioned so that the piston bottom portion 67 faces the cylinder bottom portion 32, and that the opening 51 is located on the side opposite to the cylinder bottom portion 32. When the piston 21 is thus positioned, the piston 21 is fitted, at piston side-portion 52, in the piston seal 39 disposed in the seal groove 37 of the cylinder side-portion 31. The piston 21 is thus supported by the piston seal 39 and the inner peripheral surface of the cylinder side-portion 31. The one end of the boot 40 is fitted in the boot groove 38 of the cylinder side-portion 31, and the other end of the boot 40 is fitted in the boot groove 59 of the piston 21.

A disc brake piston disclosed in the Patent Literature 1 includes an inner member formed into a bottomed cylindrical shape and an outer member fitted and fixed on an outer side of the inner member. This piston is designed to be reduced in weight by combing the two members into the piston. These members are formed chiefly by press work, so that the wall thickness of a product is determined by the sheet thickness of a steel sheet to be subjected to the press work. For that reason, if the sheet thickness is selected in accordance with the piston bottom portion in which a high stress is generated by brake fluid pressure, the side surface portion will have too much wall thickness. This makes it likely that a weight-reducing effect is small.

Unlike such a piston, the piston 21 of the first embodiment includes the body member 54 including the cylindrical body side-portion 52 and the body bottom portion 53. The one side of the body side-portion 52 is opened to form the opening 51. The body bottom portion 53 is disposed on the side opposite to the opening 51 of the body side-portion 52. The piston 21 further includes the plate-shaped member 56 disposed within the range of the body external bottom surface 55 on an outer side of the body bottom portion 53, and disposed in the region including the radial center of the body bottom portion 53. This enables the piston bottom portion 67 to be effectively improved in strength by adjusting the sheet thickness of the plate-shaped member 56. In other words, the piston bottom portion 67 in which a particularly high stress is generated due to the brake fluid pressure is provided with a required strength with use of the plate-shaped member 56, and the piston side-portion 52 is provided with a required strength by the sheet thickness of the steel sheet subjected to the press work. This makes it possible to easily design the optimum sheet thickness in accordance with maximum stress generated in every region of the piston 21, and thus achieve an effective weight reduction. It is consequently possible to reduce the weight of a vehicle in which the piston is installed, improve a fuel consumption rate, and also enhance driving stability.

Since the piston bottom portion 67 of the piston 21 has a structure in which the plate-shaped member 56 is bonded to the body bottom portion 53 of the body member 54, a kinetic energy loss is generated as the result of small deformation caused in the adhesion layer 65, as shown in FIGS. 3(b) and 3(c), which is an adhesion part illustrated in a conceptual drawing in FIG. 3(a). The kinetic energy loss produces an oscillation damping effect and an effect of preventing or reducing brake noises and the like. In other words, the adhesion layer 65 between the body bottom portion 53 of the body member 54 and the plate-shaped member 56 reduces the oscillation of the piston 21, causing the effect of preventing or reducing the brake noises and the like.

In addition, since the phenol-based adhesive is used as the adhesive for bonding the body member 54 and the plate-shaped member 56 to each other, it is possible to obtain resistance properties against brake fluid and the heat generated during braking.

In order to enhance the oscillation damping effect, the piston 21 may have a structure in which an elastic damping member is sandwiched by the body bottom portion 53 of the body member 54 and the plate-shaped member 56. In other words, the body member 54 may be fixed to one surface of the damping member with an adhesive, and the other surface of the damping member may be fixed to the plate-shaped member 56 with an adhesive. The damping member may be a sheet material made of EPDM (ethylene propylene rubber) which is resistant to brake fluid.

Figure 4:
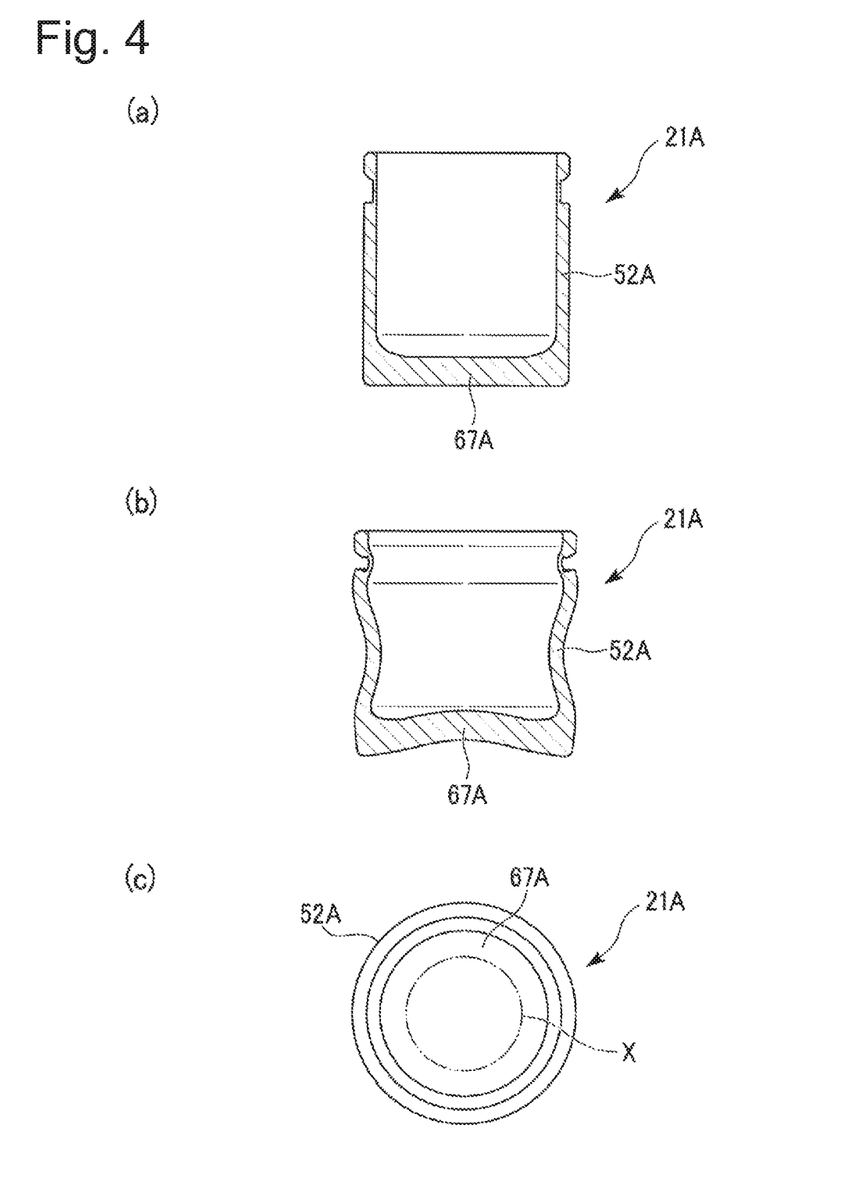
Figure 5:
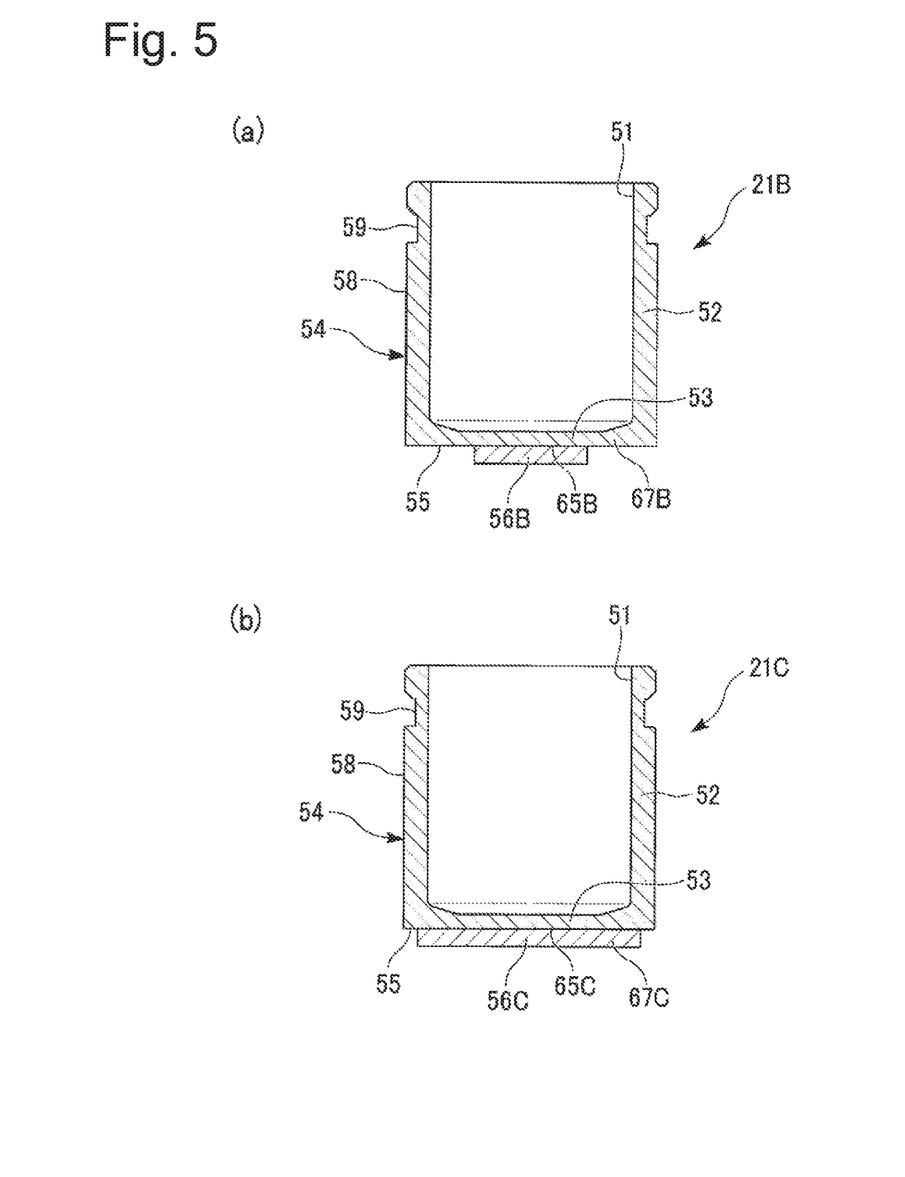

A comparison was made between a piston 21A as a standard for comparison and the piston 21 of the first embodiment by a FEM analysis (finite element method analysis). The piston 21A is a single piece shown in FIG. 4, which is formed chiefly by press work. The piston 21 has a structure in which the plate-shaped member 56 separate from the body member 54 which is a single piece formed chiefly by press work is bonded to the body member 54.

As shown in TABLE 1, the standard piston 21A is made of steel and includes a piston bottom portion 67A having a sheet thickness of 5.8 mm and a piston side-portion 52A having a sheet thickness of 4.3 mm. The piston 21A has a mass of 255 grams. A maximum principal stress generated by addition of fluid pressure is 116 MPa.

TABLE 1

| Material | STEEL |
|---|---|
| Mass | 255 grams |
| Sheet thickness of the bottom portion | 5.8 mm |

TABLE 1-continued

| Material | STEEL |
|---|---|
| Sheet thickness of the side-portion | 4.3 mm |
| Maximum principal stress | 116 MPa |

FIG. 4(a) shows a state of the standard piston 21A before the addition of fluid pressure. FIG. 4(b) shows a deformed state of the standard piston 21A during the addition of fluid pressure, which is obtained by the FEM analysis. FIG. 4(c) shows a maximum principal stress generation position X of the standard piston 21A. As shown by a chain double-dashed line in FIG. 4(c), the maximum principal stress generation position X is located at a radial center of the piston bottom portion 67A. Stress generated in the piston side-portion 52A is smaller than that in the maximum principal stress generation position X. In this view, if the piston bottom portion which requires rigidity is made large in wall thickness, and the piston side-portion which requires lower rigidity than the piston bottom portion is made small in sheet thickness, a more effective weight reduction can be expected.

In order to achieve the effective weight reduction, in the first embodiment, the FEM analysis was performed on the piston 21 in which the piston side-portion 52 is reduced in wall thickness, and the plate-shaped member 56 is bonded to the body bottom portion 53, which is unfavorably reduced in wall thickness as with the piston side-portion 52, of the body member 54 to equalize the wall thickness of the piston bottom portion 67 with that of the standard piston. Results of the FEM analysis show that even if the piston bottom portion 67 is provided with a wall thickness of 5.9 mm which is equivalent to that of the standard piston, as shown in TABLE 2, the piston 21 has a mass of 198 grams and is thus reduced in weight by about 22 percent as compared to the standard piston. In addition, the stress on the piston bottom portion 67 becomes 163 MPa, which means that the piston bottom portion 67 has approximately the same rigidity as that of the standard piston.

TABLE 2

| Material | STEEL |
|---|---|
| Mass | 198 grams (Reduced by 22%) |
| Sheet thickness of the bottom portion | 5.9 mm |
| Stress on the center of the bottom portion | 163 MPa |

The plate-shaped member 56 may be made of the same material as that of the body member 54, or may be made of a phenol-based resin material if the phenol-based resin material satisfies conditions of strength and temperature.

The plate-shaped member 56 shown in FIG. 2 may be placed in any position as long as it is disposed within the range of the body external bottom surface 55 of the body bottom portion 53 and in the region including the center of the body bottom portion 53. For example, as can be seen in the piston 21B of FIG. 5(a), a piston bottom portion 67B may be formed by bonding a plate-shaped member 56B, which has an outer diameter that is smaller than the outer diameter of the body external bottom surface 55 of the body bottom portion 53 of the body member 54 and is equal to or smaller than an inner diameter of the body side-portion 52, to the body external bottom surface 55 with an adhesion layer 65B. As can be seen in a piston 21C of FIG. 5(b), a piston bottom portion 67C may be formed by bonding a plate-shaped member 56C, which has an outer diameter that is smaller than the outer diameter of the body external bottom surface 55 of the body bottom portion 53 of the body member 54 and is larger than the inner diameter of the body side-portion 52, to the body external bottom surface 55 with an adhesion layer 65C. The plate-shaped member 56C having the outer diameter larger than the inner diameter of the body side-portion 52 as shown in FIG. 5(b) receives much smaller stress than the plate-shaped member 56B having the outer diameter equal to or smaller than the inner diameter of the body side-portion 52 as shown in FIG. 5(a). It is therefore preferable that the plate-shaped member 56C with the outer diameter larger than the inner diameter of the body side-portion 52, namely, the inner diameter of the body member 54 be disposed in the region including the center of the body bottom portion 53 in the body external bottom surface 55 of the body bottom portion 53.

Second Embodiment

A second embodiment will be explained below mainly with reference to FIGS. 6 to 8 with a focus on differences from the first embodiment. The same components as those of the first embodiment will be provided with the same names and reference numerals.

Figure 6:
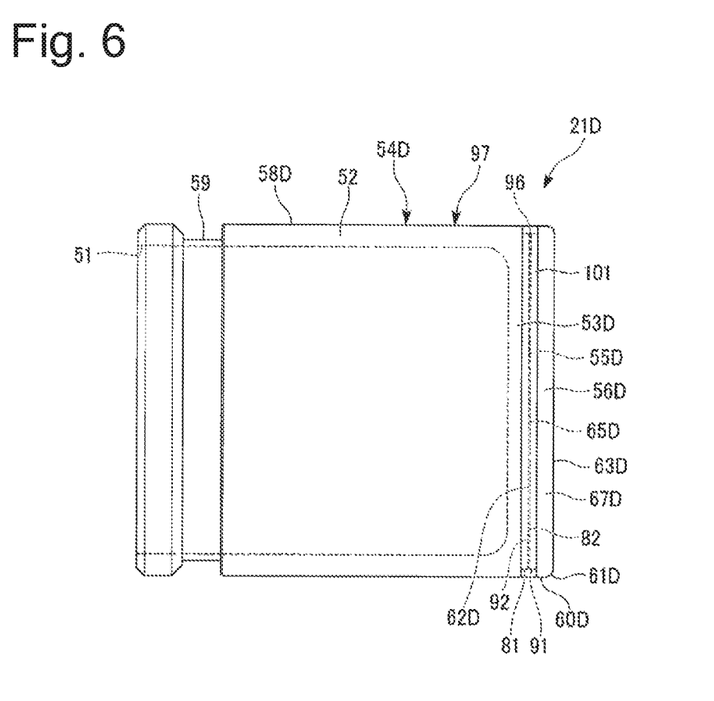
FIG. 6 is a side view of a piston according to a second embodiment.

As shown in FIG. 6, according to the second embodiment, a piston 21D includes a body member 54D and a plate-shaped member 56D, which are partially different from those in the first embodiment.

A body bottom portion 53D is disposed on the side opposite to an opening 51 of a body's lateral portion 25. An annular stepped portion 81 is formed in the body member 54D, which is disposed on the side opposite to an opening 51 of the body side-portion 52, so as to be located in an outer peripheral area of the body bottom portion 53D which area is located opposite the opening 51. In the body bottom portion 53D, there is provided a middle surface portion 82 radially inside the stepped portion 81. The middle surface portion 82 is a circular flat surface orthogonal to a central axis of the body side-portion 52.

Figure 7:
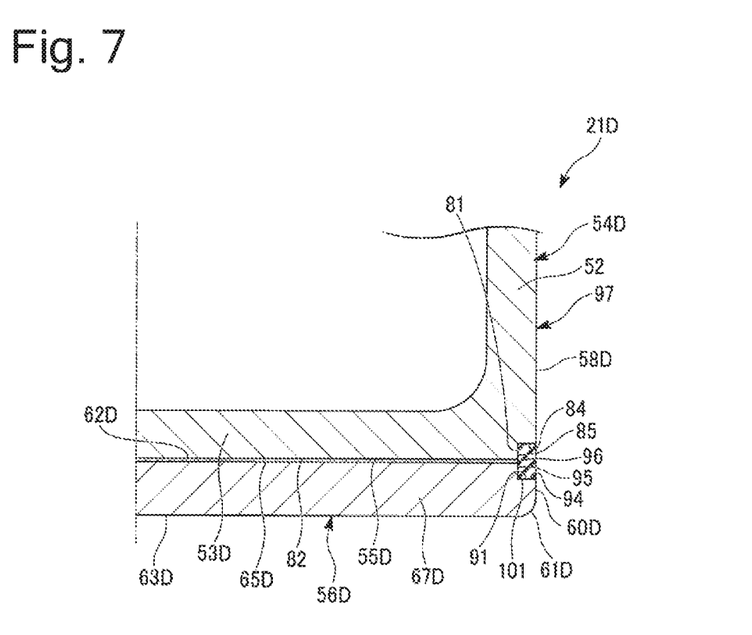
FIG. 7 is a sectional view of a relevant part of the piston according to the second embodiment.
Figure 8:
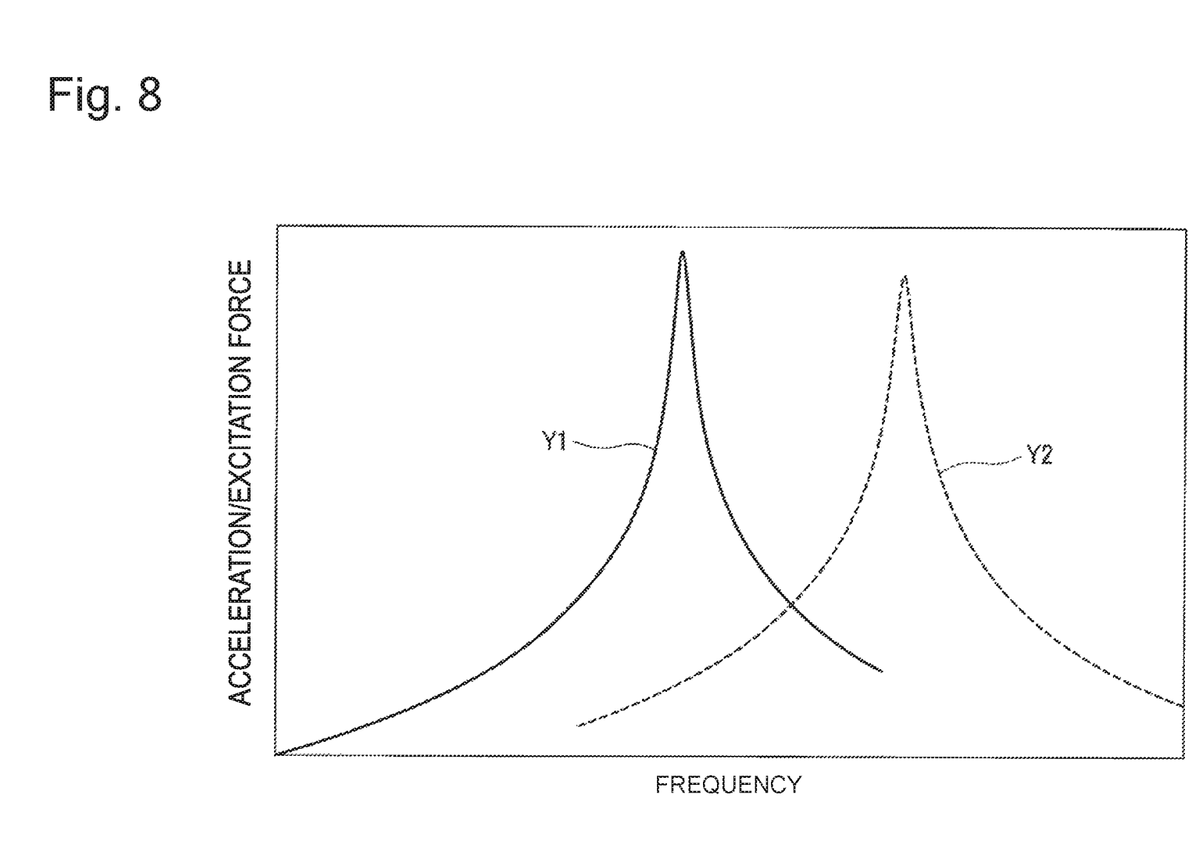
FIG. 8 shows curves showing the results of frequency response analyses on the pistons according to the first and second embodiments.

As shown in FIG. 7, the stepped portion 81 includes an annular step surface portion 84 extending radially inward from a cylindrical maximum outer diameter surface 58D of the body member 54D, and a cylindrical wall surface portion 85 that extends from an inner peripheral edge of the step surface portion 84 toward the middle surface portion 82 and continues to the middle surface portion 82. The wall surface portion 85 is disposed coaxially with the maximum outer diameter surface 58D. The step surface portion 84 is a flat surface parallel to the middle surface portion 82. The middle surface portion 82, the wall surface portion 85, and the step surface portion 84 form a body external bottom surface 55D located on an outer side opposite to the opening 51 of the body bottom portion 53D.

As shown in FIG. 6, an annular stepped portion 91 is formed in an outer peripheral area, which is located on the side opposite to a surface 63D forming a piston external bottom surface, of the plate-shaped member 56D. The plate-shaped member 56D is provided with a flat, circular surface 62D radially inside the stepped portion 91. The surface 62D has area that is equal to area of the middle surface portion 82 of the body member 54D. The surfaces 62D and 63D are arranged parallel to each other.

As shown in FIG. 7, the stepped portion 91 includes an annular step surface portion 94 extending radially inward from the cylindrical maximum outer diameter surface 60D of the plate-shaped member 56D, and a cylindrical wall surface portion 95 that extends from an inner peripheral edge of the step surface portion 94 toward the surface 62D and continues to the surface 62D. The wall surface portion 95 is disposed coaxially with the surface 62D. The step surface portion 94 is a flat surface parallel to the surface 62D. A round chamfering 61D is formed between the maximum outer diameter surface 60D and the surface 63D.

A whole surface of the surface 62D of the plate-shaped member 56D is bonded with an adhesive to a whole surface of the middle surface portion 82 of the body member 54D. The plate-shaped member 56D is thus coaxially fixed to the body member 54D. This is how a piston body 97 is formed, which includes the body member 54, the plate-shaped member 56D, and an adhesion layer 65D intervening between the body member 54D and the plate-shaped member 56D. The plate-shaped member 56D attached to the body member 54D is disposed within a radial range of the body external bottom surface 55D of the body bottom portion 53D of the body member 54D and in a region including a radial center of the body bottom portion 53D. The plate-shaped member 56D covers the whole surface of the middle surface portion 82 located at the radial center of the body external bottom surface 55D.

The stepped portions 81 and 91 form an annular seal groove 96 in an outer peripheral portion of the piston body 97. The seal groove 96 is indented radially inward with respect to the greatest outer diameter faces 58D and 60D. The seal groove 96 is formed in the piston body 97 so as to surround the adhesion layer 65D.

The piston 21D includes an annular seal member 101 (damping member) that is fitted in the seal groove 96 of the piston body 97. The seal member 101 is an endless square ring having a rectangular cross section. The piston 21D thus has the seal member 101 between the body bottom portion 53D and the plate-shaped member 56D. The seal member 101 is closely attached to the entire peripheries of the wall surface portions 85 and 95 to seal the entire periphery of the adhesion layer 65D in the radially outer side. The seal member 101 is made of EPDM that is resistant to brake fluid. The body bottom portion 53D of the body member 54D, the adhesion layer 65D, the plate-shaped member 56D, and the seal member 101 form the piston bottom portion 67D of the piston 21D.

The second embodiment also enables the piston 21D to be effectively reduced in weight. Results of the FEM analysis show that even if the piston bottom portion 67D is provided with a wall thickness of 5.9 mm which is equivalent to that of the standard piston 21A, as shown in TABLE 3, the piston 21D has a mass of 203 grams, and thus the piston 21D can be reduced in weight by about 20 percent as compared to the standard piston. In addition, stress on the piston bottom portion 67D becomes 177 MPa, which means that the piston bottom portion 67D has approximately the same rigidity as that of the standard piston 21A.

TABLE 3

| Material | STEEL |
| --- | --- |
| Mass | 203 grams (Reduced by 20%) |
| Sheet thickness of the bottom portion | 5.9 mm |
| Stress on the center of the bottom portion | 177 MPa |

According to the second embodiment, the piston 21D includes the seal member 101 between the body bottom portion 53D and the plate-shaped member 56D. This prevents or reduces an impact of the brake fluid on the adhesion layer 65D and then improves the piston 21D in durability.

The seal member 101 provided to the piston 21D enhances the oscillation damping effect. Namely, the seal member 101 placed between the body bottom portion 53D and the plate-shaped member 56D also serves as a damping member for damping oscillation. FIG. 8 shows results of an analysis of a frequency response. The analysis obtains a response of the radial center of the piston bottom portion on the condition that the radial center of the piston bottom portion is oscillated in the axial direction at an excitation force of 1 mN, where rubber material, which is the seal member 101, has a loss coefficient of 20 percent. As is evident in FIG. 8, a maximum value of an acceleration/ excitation force ratio in the piston 21D shown by a dash line Y2 in FIG. 8 can be reduced by about 18 percent, as compared to the piston 21 of the first embodiment shown by a solid line Y1 in FIG. 8.

In order to further enhance the oscillation damping effect, the piston may have a structure in which the damping member for damping oscillation is sandwiched by the body bottom portion 53D and the plate-shaped member 56D of the body member 54D. In other words, the body member 54D may be fixed to one surface of the damping member with an adhesive, and the other surface of the damping member may be fixed to the plate-shaped member 56D with an adhesive. The damping member may be a sheet material made of EPDM that is resistant to brake fluid.

Third Embodiment

Figure 9:
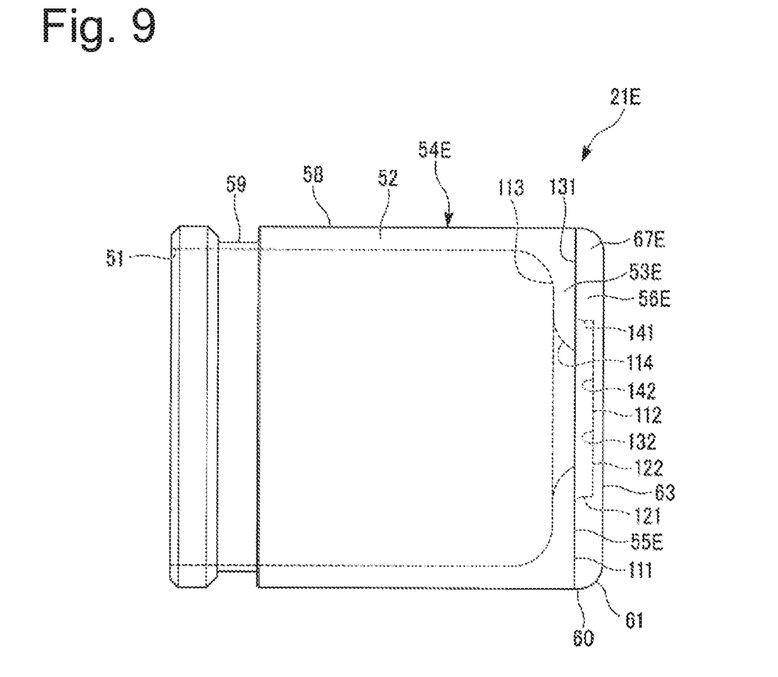
FIG. 9 is a side view of a piston according to a third embodiment.

A third embodiment will be now described with reference mainly to FIGS. 9 and 10 with a focus on differences from the first embodiment. The same components as those of the first embodiment will be provided with the same names and reference numerals.

According to the third embodiment, a piston 21E includes a body member 54E and a plate-shaped member 56E which partially differ from the first embodiment.

The body member 54E is provided with an annular surface portion 111 formed of an annular flat surface orthogonal to a central axis of a body side-portion 52. The annular surface portion 111 is located on an outer periphery side opposite to an opening 51 of a body bottom portion 53E, which is located on the side opposite to the opening 51 of the body side-portion 52. A convex portion 112 is formed in a radial central region of the body bottom portion 53E. The convex portion 112 protrudes in a direction opposite to the opening 51 with respect to the annular surface portion 111 located on the outer side of the body bottom portion 53E. The convex portion 112 is also formed by press work. An annular surface portion 113 is provided on the opening 51 side of the body bottom portion 53E. The annular surface portion 113 is formed of an annular flat surface orthogonal to the central axis of the body side-portion 52. A concave portion 114 is formed in a central region of the body bottom portion 53E. The concave portion 114 is indented in the direction opposite to the opening 51 with respect to the annular surface portion 113 located on the outer side of the body bottom portion 53E.

The convex portion 112 includes a cylindrical wall surface portion 121 extending from an inner peripheral edge of the annular surface portion 111 in the direction opposite to the opening 51, and a circular central surface portion 122 expanding radially inward from an end edge of the wall surface portion 121 which end edge is located on the side opposite to the opening 51. The wall surface portion 121 is disposed coaxially with a cylindrical greatest outer diameter surface 58 of the body member 54E. The central surface portion 122 is a flat surface parallel to the annular surface portion 111. The annular surface portion 111, the wall surface portion 121, and the central surface portion 122 form a body external bottom surface 55E located on an outer side opposite to the opening 51 of the body bottom portion 53E.

The plate-shaped member 56E is provided with an annular surface portion 131 formed of a flat surface. The annular surface portion 131 is located on an outer periphery side of the plate-shaped member 56E, which is located opposite to the surface 63 forming the piston external bottom surface. In a radial central portion of the plate-shaped member 56E, there is formed a concave portion 132 which is indented toward the surface 63 with respect to the annular surface portion 131 located on the outer side of the plate-shaped member 56E. The annular surface portion 131 is formed parallel to the surface 63.

The concave portion 132 includes a cylindrical wall surface portion 141 extending from an inner peripheral edge of the annular surface portion 131 toward the surface 63, and a circular central surface portion 142 expanding radially inward from an end edge on the surface 63 side of the wall surface portion 141. The wall surface portion 141 is disposed coaxially with the greatest outer diameter face 60 of the plate-shaped member 56E. The central surface portion 142 is a flat face parallel to the annular surface portion 131.

Figure 10:
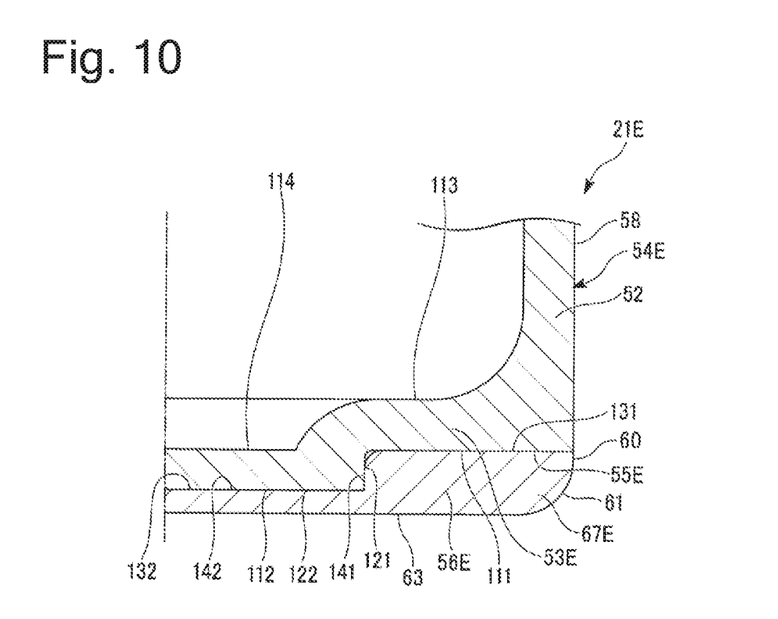
FIG. 10 is a sectional view of a relevant part of the piston according to the third embodiment.

As shown in FIG. 10, the wall surface portion 121 of the convex portion 112 of the body member 54E is directly fitted in the wall surface portion 141 of the concave portion 132 of the plate-shaped member 56E, and the plate-shaped member 56E is thus coaxially fixed to the body member 54E. At this time, the annular surface portion 111 of the body member 54E and the annular surface portion 131 of the plate-shaped member 56E are brought into contact with each other. The convex portion 112 is thus press-fitted in the concave portion 132, to thereby form the piston 21E including the body member 54E and the plate-shaped member 56E. The plate-shaped member 56E attached to the body member 54E is disposed within a radial range of the body external bottom surface 55E of the body bottom portion 53E of the body member 54E and in a region including a radial center of the body bottom portion 53E. The plate-shaped member 56E covers a % hole surface of the central surface portion 122 at a radial center of the body external bottom surface 55E. The body bottom portion 53E of the body member 54E and the plate-shaped member 56E form a piston bottom portion 67E of the piston 21E.

The third embodiment also effectively reduces weight of the piston 21E.

According to the third embodiment, the piston 21E is constructed not by adhesion using an adhesive but by fitting the convex portion 112 which is located in the central portion of the body bottom portion 53E of the body member 54E made of metal, directly into the concave portion 132 of the plate-shaped member 56E made of metal. This prevents or reduces an impact of the brake fluid on the piston 21E, resulting in improvement in durability of the piston 21E. In this case, contrary to the foregoing case, the convex portion and the concave portion may be formed in the plate-shaped member and the central portion of a body bottom portion of a body member, respectively, and the convex portion and the concave portion may be fitted together. In other words, the piston 21E may be configured in any manner as long as one of the central portion of the body bottom portion and the plate-shaped member includes a concave portion; the other of the central portion of the body bottom portion and the plate-shaped member includes a convex portion; and the concave and convex portions are fitted together.

Conceivable disc brakes based on the above-described embodiments include ones according to the following aspects.

According to a first aspect, provided is a disc brake including a piston for pressing a pad against a disc. The piston includes a body member formed into a bottomed cylindrical shape and including a cylinder portion and a bottom portion. The cylinder portion and the bottom portion are approximately equal in wall thickness. The piston further includes a plate-shaped member fixed to an external bottom surface of the body member, and disposed within a range of the external bottom surface and in a region including a center of the external bottom surface. This makes it possible to achieve an effective weight reduction.

According to a second aspect, in the first aspect, the plate-shaped member is bonded and fixed to the external bottom surface with a phenol-based adhesive. This makes it possible to obtain resistance properties against brake fluid and the heat generated during braking.

According to a third aspect, in the first aspect, an elastic damping member is placed between the external bottom surface and the plate-shaped member. This makes it possible to obtain an oscillation damping effect and also obtain an effect of preventing or reducing brake noises and the like.

According to a fourth aspect, in the first or second aspect, a seal member is placed between the external bottom surface and the plate-shaped member. This makes it possible to prevent or reduce an impact of brake fluid on the piston, resulting in improvement in durability of the piston.

According to a fifth aspect, in the first aspect, the external bottom surface and the plate-shaped member are fixed to each other by concave-convex fitting. This makes it possible to prevent or reduce an impact of brake fluid on the piston, resulting in improvement in durability of the piston.

According to a sixth aspect, provided is a disc brake piston for pressing a pad against a disc. The piston includes a plate-shaped member fixed to an external bottom surface of a body member formed into a bottomed cylindrical shape in which a cylinder portion and a bottom portion which are approximately equal in wall thickness. The plate-shaped member is disposed within a range of the external bottom surface and in a region including a center of the external bottom surface. This makes it possible to achieve an effective weight reduction.

The foregoing description refers to some embodiments of the invention. These embodiments are intended not to limit the invention but to assist in understanding the invention. Needless to say, the invention may be modified or improved without departing from the gist of the invention and includes the equivalents thereto. The elements mentioned in the claims and the specification may be arbitrarily combined or omitted as long as at least a part of the above-mentioned problem is solved or at least a part of the advantageous effects is produced.

The present application claims priority to Japanese Patent Application No. 2015-210039 filed on Oct. 26, 2015. The entire disclosure of Japanese Patent Application No. 2015-210039 filed on Oct. 26, 2015, including the specification, the claims, the drawings and the abstract, is incorporated herein by reference in its entirety.

REFERENCE SIGNS LIST

11 Disc brake; 13 Pad; 15 Disc: 21, 21B to 21E Piston: 51 Opening; 52 Body side-portion (side-portion); 53, 53D, 53E Body bottom portion (bottom portion); 54, 54D, 54E Body member: 55, 55D, 55E Body external bottom surface (external surface of the bottom portion); 56, 56B to 56E Plate-shaped member; 65 Adhesion layer (damping member): 101 Seal member (damping member); 112 Convex portion; 132 Concave portion

The invention claimed is:

1. A disc brake piston for pressing a pad against a disc, comprising:
a plate-shaped member fixed to an external bottom surface of a body member formed into a bottomed cylindrical shape in which a cylinder portion and a bottom portion are approximately equal in wall thickness,
wherein the plate-shaped member is disposed within a range of the external bottom surface and in a region including a center of the external bottom surface, and
wherein an elastic damping member is placed between the external bottom surface and the plate-shaped member that one whole surface of the plate-shaped member is adhesively fixed via the damping member to the external bottom surface.

2. The disc brake piston of claim 1, wherein the plate-shaped member is bonded and fixed to the external bottom surface with a phenol-based adhesive.

3. A disc brake comprising the disc brake piston of claim 1.

4. A disc brake comprising the disc brake piston of claim 2.

5. A disc brake piston for pressing a pad against a disc, the piston comprising:
a body member and a plate-shaped member,
the body member being formed into a bottomed cylindrical shape in which a cylinder portion and a bottom portion are approximately equal in wall thickness, and
the plate-shaped member being fixed to an external bottom surface of the body portion, and
wherein the plate-shaped member is disposed within a range of the external bottom surface and in a region including a center of the external bottom surface, and
wherein the piston comprises a piston body;
the piston body comprises the body member, the plate member, and an adhesion layer between the body member and the plate member;
an annular seal groove is formed in an outer peripheral portion of the piston body, such that the annular seal groove is located between the body member and the plate member;
the seal groove surrounds the adhesion layer; and
an annular seal member is fitted in the seal groove.

6. The disc brake piston of claim 5, wherein the plate-shaped member is bonded and fixed to the external bottom surface with a phenol-based adhesive.

7. A disc brake comprising the disc brake piston of claim 5.

* * * * *